(12) United States Patent
Tischer

(10) Patent No.: US 8,300,550 B2
(45) Date of Patent: Oct. 30, 2012

(54) METHODS, SYSTEMS, AND COMPUTER PROGRAM PRODUCTS FOR IMPLEMENTING A VIRTUAL POSTING SERVICE

(75) Inventor: Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 584 days.

(21) Appl. No.: 12/401,837

(22) Filed: Mar. 11, 2009

(65) Prior Publication Data

US 2009/0168702 A1 Jul. 2, 2009

Related U.S. Application Data

(63) Continuation of application No. 11/085,662, filed on Mar. 21, 2005, now Pat. No. 7,525,932.

(51) Int. Cl.
H04L 12/28 (2006.01)
H04W 24/00 (2009.01)
G06F 15/16 (2006.01)

(52) U.S. Cl. ............ 370/254; 455/456.3; 709/205

(58) Field of Classification Search ............ None
See application file for complete search history.

(56) References Cited

U.S. PATENT DOCUMENTS

| | | | |
|---|---|---|---|
| 4,870,700 A | 9/1989 | Ormanns et al. | |
| 5,680,441 A | 10/1997 | Gallo | |
| 5,926,101 A | 7/1999 | Dasgupta | |
| 6,272,147 B1 * | 8/2001 | Spratt et al. | 370/447 |
| 6,697,103 B1 | 2/2004 | Fernandez et al. | |
| 6,809,760 B1 | 10/2004 | Takagi et al. | |
| 6,947,071 B2 | 9/2005 | Eichmann | |
| 6,956,614 B1 | 10/2005 | Quintana et al. | |
| 7,079,176 B1 | 7/2006 | Freeman et al. | |
| 7,266,396 B2 | 9/2007 | Terzian et al. | |
| 7,321,387 B2 | 1/2008 | Novais et al. | |
| 7,323,991 B1 | 1/2008 | Eckert et al. | |
| 7,370,077 B2 | 5/2008 | Pradhan et al. | |
| 7,382,798 B2 | 6/2008 | Sugaya | |
| 7,426,197 B2 | 9/2008 | Schotten et al. | |
| 7,501,934 B2 | 3/2009 | Tischer | |
| 7,525,932 B2 * | 4/2009 | Tischer | 370/310 |
| 2001/0026552 A1 * | 10/2001 | Spratt et al. | 370/390 |
| 2001/0045978 A1 | 11/2001 | McConnell et al. | |
| 2002/0009971 A1 * | 1/2002 | Spratt | 455/41 |
| 2002/0039135 A1 | 4/2002 | Heyden | |
| 2002/0093493 A1 | 7/2002 | Michaeli et al. | |
| 2002/0095486 A1 * | 7/2002 | Bahl | 709/223 |
| 2002/0113735 A1 * | 8/2002 | Spratt | 342/464 |
| 2002/0163901 A1 * | 11/2002 | Spratt | 370/338 |
| 2002/0186166 A1 * | 12/2002 | Spratt | 342/464 |
| 2003/0009397 A1 | 1/2003 | Whitenack et al. | |
| 2003/0067542 A1 | 4/2003 | Monroe | |
| 2003/0093797 A1 | 5/2003 | Bazzaz | |
| 2003/0097397 A1 | 5/2003 | Giannetti | |
| 2003/0117316 A1 | 6/2003 | Tischer | |

(Continued)

*Primary Examiner* — Timothy J Weidner
(74) *Attorney, Agent, or Firm* — Cantor Colburn LLP

(57) ABSTRACT

Methods, systems, and computer program products for implementing virtual posting services. Methods include receiving content from a communications device located in a geographic proximity that is serviced by an access node, storing the content in a storage device that is in communication with the access node, and tracking an amount of time the content item is stored. If the amount of time does not reach a pre-established threshold, the methods include transmitting the content to another communications device in response to detecting the presence of the other communications device within the geographic proximity and in response to an inquiry from the other communications device.

15 Claims, 6 Drawing Sheets

U.S. PATENT DOCUMENTS

| | | |
|---|---|---|
| 2004/0029582 A1 | 2/2004 | Swab et al. |
| 2004/0074448 A1 | 4/2004 | Bunt et al. |
| 2004/0156616 A1 | 8/2004 | Strub et al. |
| 2005/0135286 A1 | 6/2005 | Nurminen et al. |
| 2005/0188399 A1 | 8/2005 | Tischer |
| 2006/0046719 A1 | 3/2006 | Holtschneider |
| 2006/0062175 A1 | 3/2006 | Ling et al. |
| 2006/0074645 A1 | 4/2006 | Tischer |
| 2006/0128447 A1 | 6/2006 | Tischer et al. |
| 2006/0209744 A1 | 9/2006 | Tischer |

* cited by examiner

METHODS, SYSTEMS, AND COMPUTER PROGRAM PRODUCTS FOR IMPLEMENTING A VIRTUAL POSTING SERVICE

CROSS-REFERENCE TO RELATED APPLICATIONS

This application is a continuation of U.S. patent application Ser. No. 11/085,662 filed Mar. 21, 2005, the contents of which are incorporated by reference herein in their entirety.

BACKGROUND

The present invention relates generally to communications, and more particularly, to methods, systems, and computer program products for implementing a virtual posting service.

People live in their own domains, often with little, if any, mechanisms for interacting with others who may be near them and who may share their interests. In the realm of commerce, a question such as "where can I find the best piece of blueberry pie around here" might be answered by, e.g., a concierge at a hotel, or by a policeman since they would likely be familiar with what is in the immediate area. Given the bias of the individual answering such a question, however, a better answer might be obtained from a dynamic cross section of consumers who have collectively assembled an opinion of what the best—or for that matter the worst—place to eat in the area might be.

Currently, there is no method for allowing the asynchronous posting and discovery of information as an anonymous participant within a limited area, or proximity, and for a limited duration of time. Such information has a very high value, as it is a kind of 'informational currency' where the very latest information is most useful.

What is needed, therefore, is a way to share information, such as opinions, that is automatically assembled by a virtual posting service using networking technologies.

SUMMARY

The above disadvantages and shortcomings and others are overcome or alleviated by methods, systems, and computer program products for implementing virtual posting services. According to exemplary embodiments, the methods include receiving content from a communications device located in a geographic proximity that is serviced by an access node, storing the content in a storage device that is in communication with the access node, and tracking an amount of time the content item is stored. If the amount of time does not reach a pre-established threshold, the methods include transmitting the content to another communications device in response to detecting the presence of the other communications device within the geographic proximity and in response to an inquiry from the other communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

In accordance with exemplary embodiments, a virtual posting system is provided. The virtual posting system enables both broadcast and discovery of information that are facilitated using one or more network protocols for asynchronously allowing information sharing between individuals within a limited proximity, and with a pre-determined timeout period for information prescience in order to ensure that the information base will always be current. A virtual post refers to an information element or content item that is time sensitive and may be specific to a limited geographic region and/or grouping or community of people. A virtual post may be in any form of media (e.g., text, video, audio, images, or a combination of multi-media events). The virtual posting system provides a communications model that may accommodate multiple network protocols in order to facilitate hosting information from a maximum number of users. The virtual posting services may be implemented via a centrally-managed access node and storage facility, or stigmergically in a peer-to-peer network fashion (e.g., virtual posts communicated directly through the environment without centralized control). In a centrally managed implementation, virtual posts are transmitted and temporarily stored in a facility that may be (although not required to be) in geographic proximity of the posting entities. In a peer-to-peer implementation, virtual posts are temporarily stored on a communications device and 'discovered' by other communications devices located within a geographic proximity associated with the device storing the virtual posts. Content, or posts, may then be relayed from one communications device to another and may even extend beyond the geographic proximity as communications devices are transported from one location to another.

Figure 1:
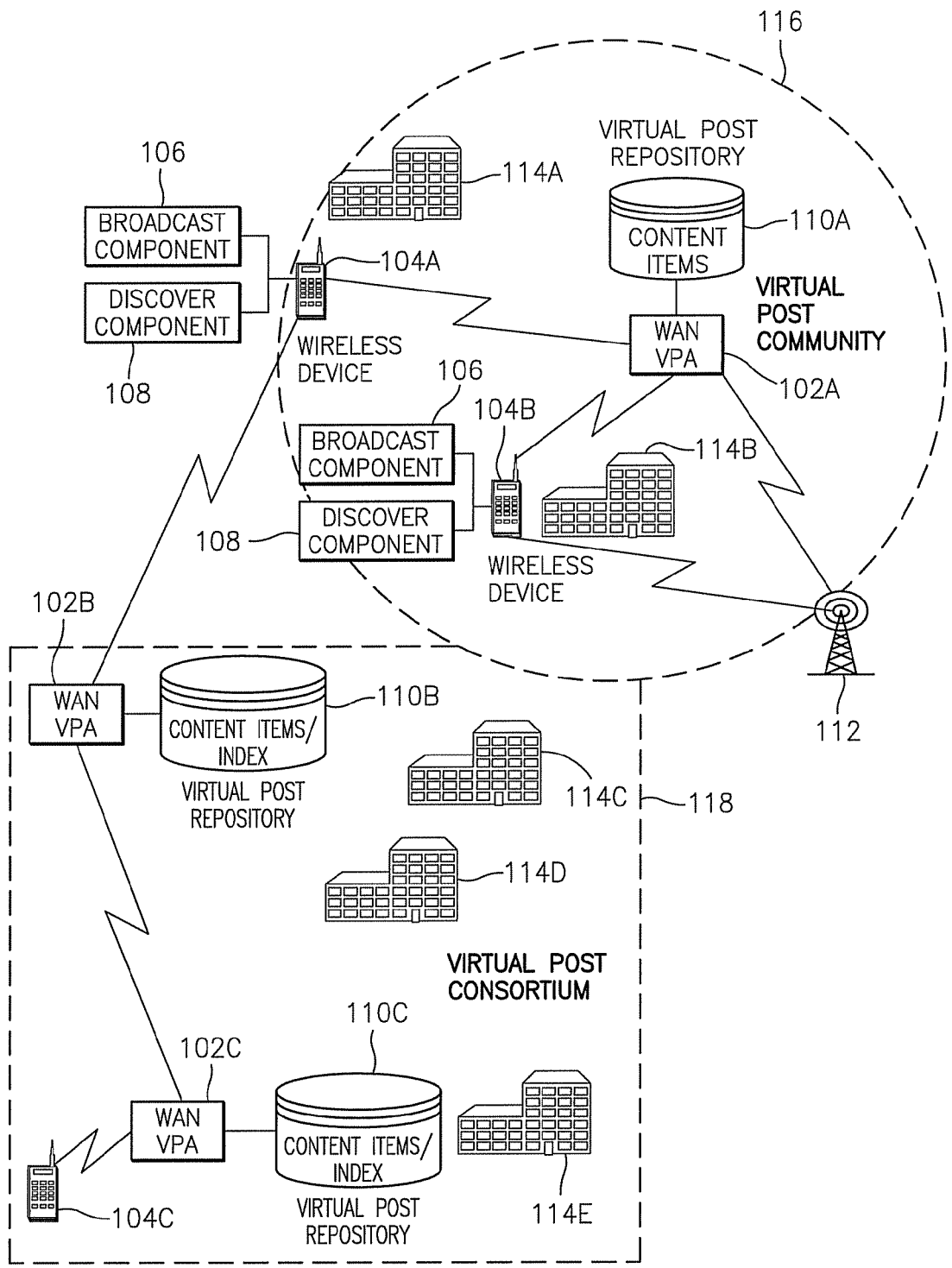
FIG. 1 is block diagram of a system upon which the virtual posting services may be implemented in exemplary embodiments.

Turning now to FIG. 1, a block diagram of a network system upon which the virtual posting services may be implemented in exemplary embodiments will now be described. For illustrative purposes, the following description refers to wireless communications devices. However, as one of ordinary skill in the art would appreciate, the invention may also be applicable to communications with wireline devices, e.g., personal computer, laptop, or similar device with broadcast/discover functionality. The system of FIG. 1 includes access nodes, e.g., wireless access nodes (WANs) 102A-102C. WANs 102A-102C include equipment for enabling wireless communications among multiple devices within a limited geographic region. The equipment may include, e.g., a base station (including a transmitter and receiver) and a processor with memory. Examples of base stations that may be utilized by WANs 102A-102C include Flexent® Modular Cell 4.0 by Lucent Technologies of Murray Hill, N.J. and Axity 3G Node B Base Station™ by Axcera of Lawrence, Pa.

In exemplary embodiments, WANs 102A-102C are distributed throughout a geographic region and installed in fixed locations (e.g., buildings, street lamps, etc.). The WANs 102A-102C may be distributed in a manner that affords access capabilities for communications devices present in any location within the region(s) serviced by the WANs (e.g., WAN 102A services a geographic region referred to as virtual post community 116). Each of the WANs' processors executes logic for facilitating the virtual post services as described herein. For example, the virtual post services may be implemented by a software application, referred to herein as virtual post application (VPA) executing on the processors. In alternative exemplary embodiments, WANs also communicate with one another via e.g., a virtual post consortium 118 of virtual post communities as described further herein. Processors for WANs 102A-102C may include a timer for tracking the length of time content is stored therein. Once the amount of time reaches or exceeds a specified amount, the content may be purged from the corresponding virtual post repositories 110A-110C.

In exemplary embodiments, communications devices 104A-104C are also included in the system of FIG. 1. Communications devices 104A-104C may include portable wireless communications devices (e.g., personal digital assistant, cellular telephone, laptop, etc.) that communicate with one or more WANs 102A-102C via wireless physical transport means. The transport may include a wireless fidelity (WiFi) type of transport that handles a small geographic range of about 150 feet (e.g., Bluetooth™), or a greater range of approximately ten miles (e.g., WiMAX). WiMAX is a standards-based technology developed by a consortium of industry leaders through a non-profit organization referred to as the WiMAX Forum™ for providing wireless broadband access. Communications technologies enabled by the virtual posting services may include code division multiple access (CDMA) and universal mobile telecommunications system (UMTS). Each of communications devices 104A-104C also includes a broadcast component 106 and a discover component 108. As indicated above, one or more of communications devices 104A-C may comprise a wireline device or, alternatively, no wireline communications devices may be employed (i.e., all devices are wireless). Communications devices 104A-C are described further herein.

In exemplary embodiments, each of WANs 102A-102C is in communication with a virtual post repository 110A-110C, respectively. Virtual post repositories 110A-110C comprise memory for storing virtual posts and may be implemented by a suitable media storage device. As shown in the system of FIG. 1, virtual post repositories 110B and 110C further include an index of virtual posts.

Cell tower 112 may also be included in the system of FIG. 1. In alternative exemplary embodiments, a portion of the virtual posting services may be facilitated by cell tower 112 in addition to WANs 102A-102C, whereby one or more of communications devices 104A-104C are in communication with cell tower 112, transmitting and receiving virtual posts.

Locations, or entities, 114A-114E are distributed throughout the system of FIG. 1. Locations 114A-114E refer to physical structures or entities that reside within a virtual post community, temporarily or permanently, and may be the subjects of one or more virtual posts in a corresponding virtual post community. For example, locations 114A-114E may include food establishments, entertainment facilities, temporary or mobile structures, such as a newspaper stand or hot dog stand, office buildings, medical facilities, places of worship, or any other structure typically found in a community.

As shown in the system of FIG. 1, WAN 102A services virtual post community 116. WAN 102A may be hosted by a service provider (e.g., wireless telecommunications service provider), a town government or chamber of commerce associated with the geographic region of the virtual post community 116, a private or non-profit organization, or other similar type of entity. The embodiment shown and described with respect to virtual post community 116 outlines a simplified implementation of the virtual posting services. In this simplified embodiment, virtual posts are transmitted to WAN 102A by either or both of communications devices 104A-104B, which have been detected by the WAN 102A, and are temporarily stored in virtual post repository 110A. This process is implemented when the devices are in broadcast mode. When the communications devices 104A and/or 104B are switched to discover mode, the WAN 102A indiscriminately retrieves the virtual posts stored in virtual post repository 110A and transmits them to the devices(s). The indiscriminate retrieval and transmission of virtual posts is performed for communications devices in passive discover mode. A flow diagram describing the broadcast mode and passive discover mode is provided in FIG. 3A.

In alternative exemplary embodiments as shown in the system of FIG. 1, WAN 102B and WAN 102C, together, provide virtual post services as a consortium of virtual post communities serving a wider geographic area. Virtual post consortium 118 may also provide additional services such as indexing the virtual posts in a manner that is easily searched and discovered. This process is provided to communications devices in active discover mode as described in the flow diagram of FIG. 3B. Further, the WANs 102B and 102C of virtual post consortium 118 may collaborate with one another, sharing information when requested.

Figure 2:
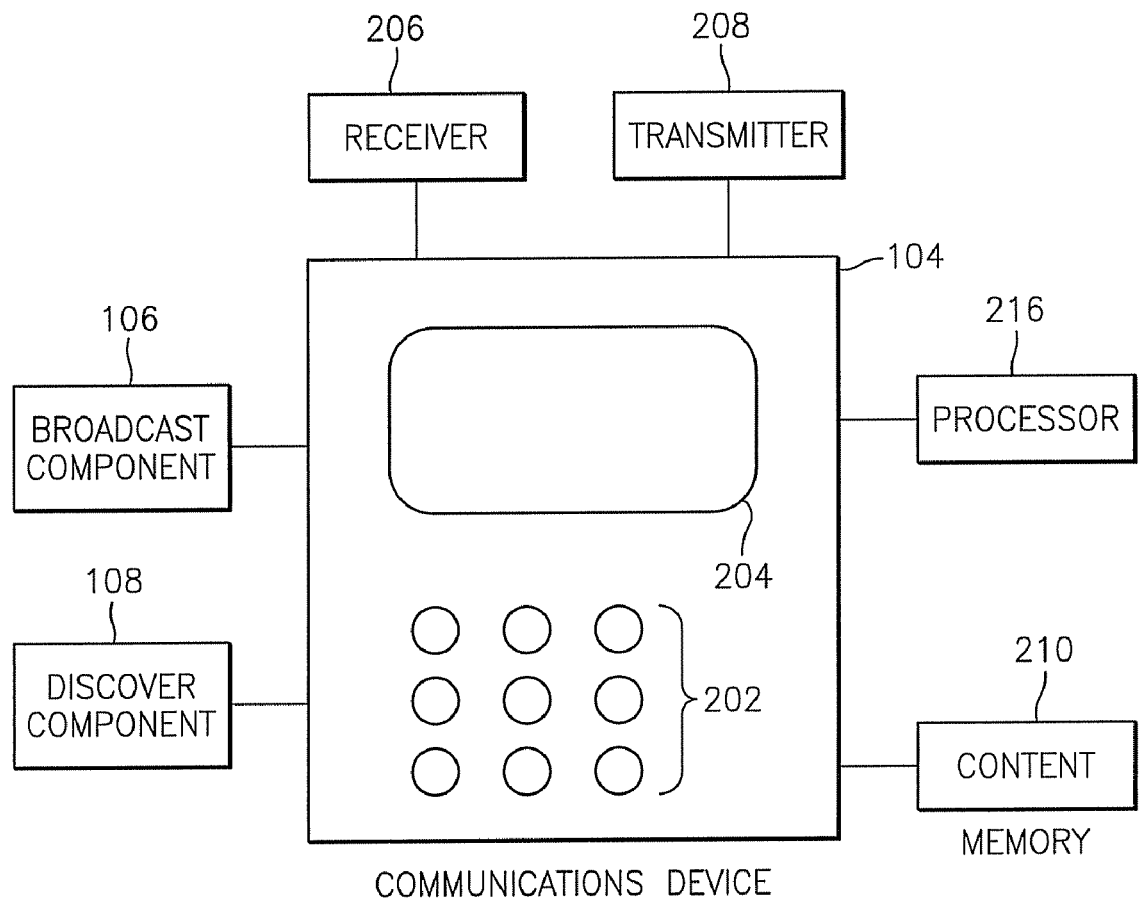
FIG. 2 is a diagram illustrating components of a communications device used in implementing the virtual posting services in exemplary embodiments.

Turning now to FIG. 2, a communications device utilized in implementing the virtual posting services in accordance with the fixed location WAN embodiment depicted in FIG. 1 will now be described. Communications device 104 comprises an input means 202 (e.g., keyboard, number keys, analog receiver, etc.) for inputting content for virtual posting. Communications device 104 also includes an output means 204 (display, analog transmitter, etc.) for perceiving the virtual posts. Additionally, communications device 104 includes a receiver 206 and transmitter component 208 for receiving and sending communications such as content relating to virtual posts. Communications device 104 also includes memory 210. The memory 210 may store virtual posts received via access nodes during implementation of the virtual posting services. In addition to these components, communications device 104 also includes a broadcast component 106 and a discover component 108. Broadcast component 106 enables a user of a communications device to create and transmit virtual posts to an access node (e.g., WAN), while discover component 108 enables a user to be discovered by an access node (e.g., WAN) and receive virtual posts.

The functionality of the broadcast and discover components 106/108 may be implemented using various techniques. For example, broadcast component 106 may be implemented by intermittently sending out an agreed-upon sequence of information over an agreed-upon network frequency (e.g., a sequence "virtual post participant"). At the network layer, this may be transmitted intermittently using any network connectivity in sequence. Similarly, the discovery component 108 may be implemented by scanning each allowable frequency for determining if a transmission is currently available (e.g., similar to a police band scanner). The discovery component 108 would repeatedly scan for any transmissions meeting the criteria for participating in the virtual post community (e.g., an identifying string or the discovery of a carrier frequency within allowed bands).

Figure 3A:
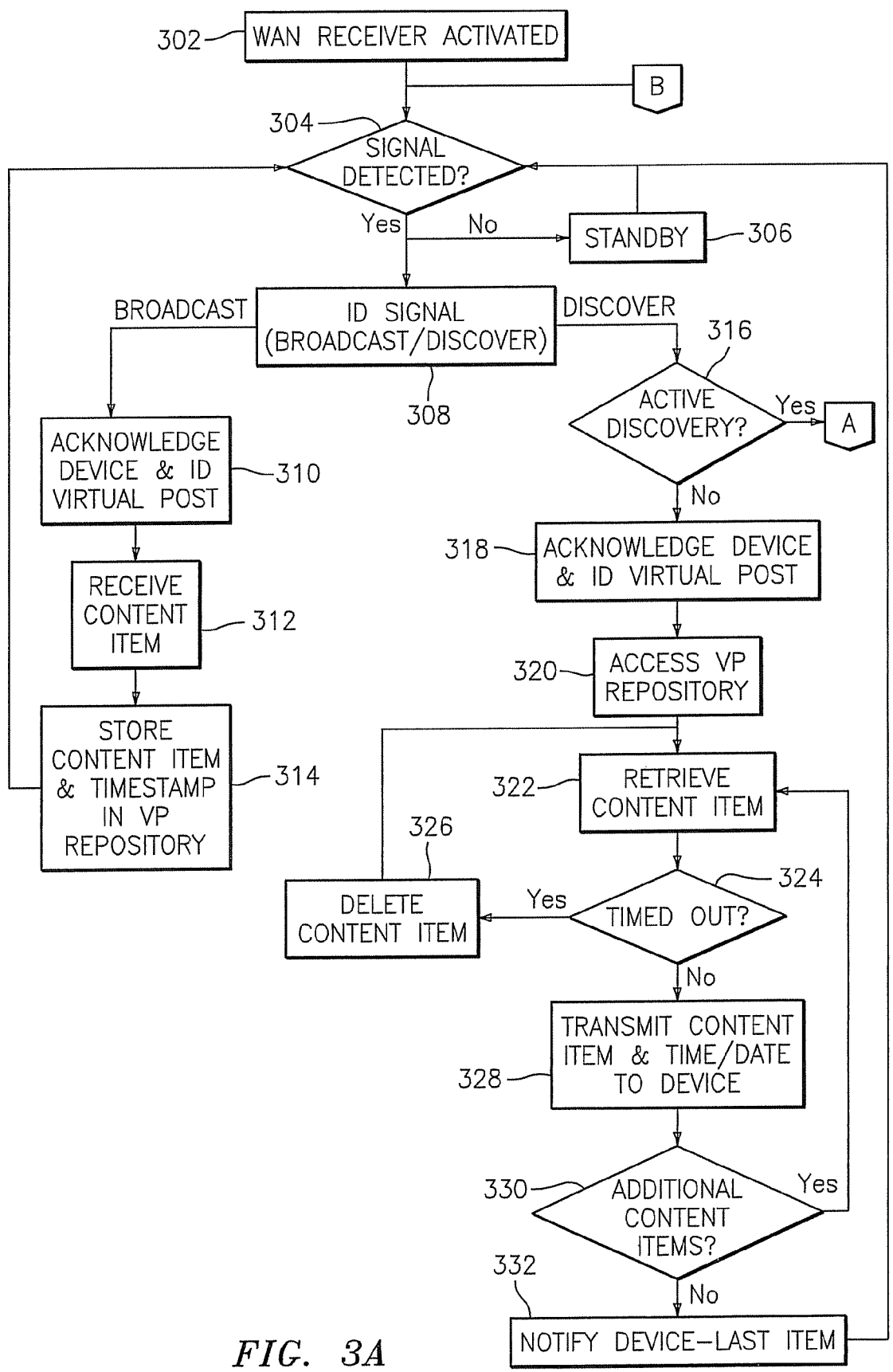
FIG. 3A-3B is a flow diagram describing a process for implementing the virtual posting services in exemplary embodiments.
Figure 3B:
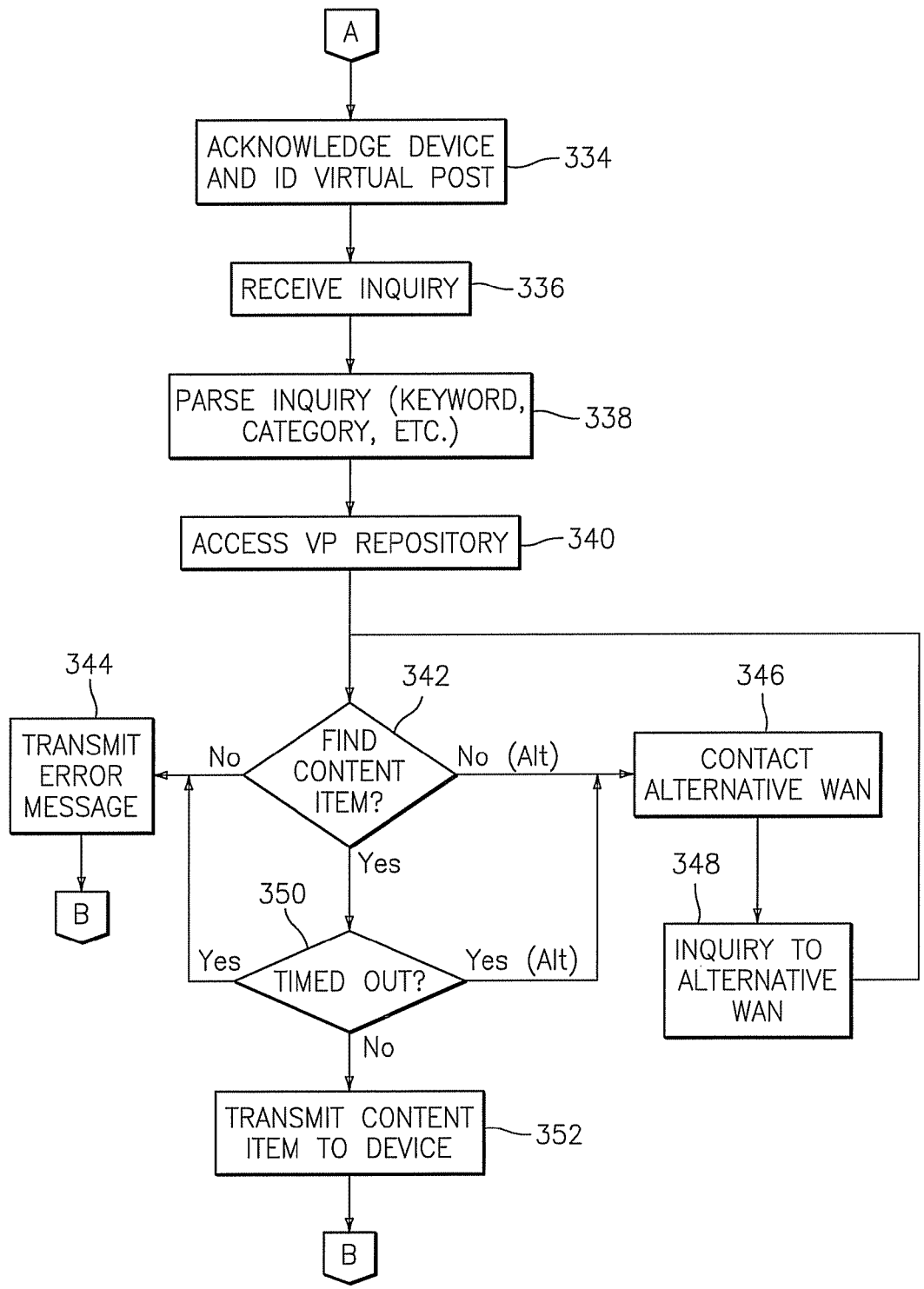

Turning now to FIG. 3A-3B, a process for implementing the virtual post system in exemplary embodiments will now be described. The virtual post services are described in FIG. 3A-3B with respect to a fixed location WAN within a virtual post community. However, it will be understood that the process steps provided in FIG. 3A-3B may be modified to accommodate a peer-to-peer implementation of the virtual post services.

A WAN (e.g., one of WANs 102A-102C) is activated for a virtual post community (e.g., 116) or virtual post consortium (e.g., 118) at step 302. Activation includes initializing the processor and receiver elements of the WAN. The receiver continuously checks for signals indicating the presence of a communications device (i.e., a communications device in discover mode) in the virtual post community. The discover component 106 of FIG. 1 enables a communications device to continuously send out signals in order to establish its presence in a virtual post community or consortium. If a signal is not detected by the WAN at step 304, the WAN's receiver remains active in a standby status waiting for prospective signals at step 306. If a signal is detected at step 306, the WAN identifies the signal transmitted by the communications device in order to determine whether the device is in broadcast mode or discover mode. The virtual post services may include an identification component that allows participants in a virtual post community to identify themselves. Additionally, user authentication technologies may be employed as part of the virtual posting services, e.g., voice print matching, encrypted keys, or other combinations of sensed information.

If the signal is determined to be a broadcast signal, the virtual post application commands the WAN to transmit an acknowledgement message to the communications device, informing the device that it is capable of receiving a virtual post from the device, e.g., text acknowledgement, a flashing symbol or light emitted on the device, etc. Using an example to illustrate the broadcast process, suppose that a user of communications device 104B of FIG. 1 has exited a Greek restaurant (e.g., location 114B) a few moments ago. The user is highly satisfied with the quality of the food at this establishment and wishes to immediately notify any interested individuals who may be nearby about this positive experience. Once the user receives the acknowledgement from the WAN 102A at step 310, he or she provides an opinion about the Greek restaurant into the communications device 104B. This may be performed via audio means (e.g., speaking into the device), by data entry (e.g., text message), or a multimedia item (e.g., snapshot of restaurant and test message), as determined by the device's capabilities. The information, or content item, is transmitted from the device 104B to the WAN 102A. The WAN 102A receives the content item at step 312 and stores the content item in the virtual post repository 110A as a virtual post at step 314. The WAN's processor may also timestamp the content item and store the timestamp along with the content item at step 314. These, and other, content items may be stored in virtual post repository 110A.

Returning back to step 308, the WAN evaluates the signal in order to determine whether the device transmitting the signal is in broadcast mode or discover mode. There are two types of discover mode, active and passive. In active discover mode, the user desires content items specific to a topic of interest via, e.g., an index of topics provided by the virtual post application of the WAN, or by search tool provided by the virtual post application provided by the WAN. In passive discover mode, the user receives content items in virtual post repository 110A in an indiscriminate manner (e.g., in order of receipt by timestamp).

Figure 4:
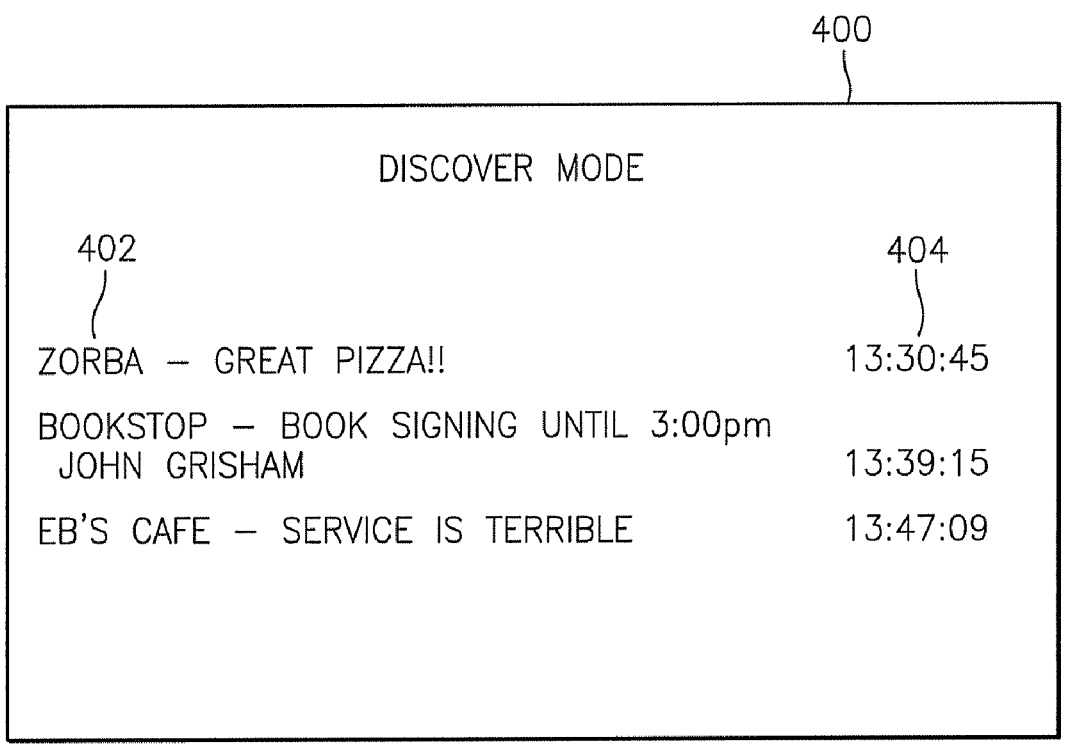
FIG. 4 is a user interface screen illustrating sample virtual posts enabled by the virtual posting system in exemplary embodiments.

In step 316, it is determined that the communications device is in passive discover mode. The virtual post application of the WAN transmits an acknowledgement message at step 318. Using the example above, suppose a user of communications device 104A is looking for a recommendation for a place to have lunch. The user activates the discover component 106 on the communications device 104A and a signal is transmitted and received by the WAN 102A. Once the user has been acknowledged (step 318), the virtual post application of WAN 102A accesses the virtual post repository 110A at step 320 and retrieves a content item at step 322. The virtual post application continuously updates the content in the repository so that only the most current information is available for discovery. This may be performed by checking the timestamp of the content item and comparing it to the current time. If the time difference between the two exceeds a specified amount of time at step 324, the content item is deleted from the virtual post repository 110A at step 326 and the process returns to step 322 whereby another content item in the repository 110A is retrieved. Otherwise, the content item is transmitted along with the timestamp to the communications device 104A at step 328. A sample user interface screen for communications device 104A is shown in FIG. 4. The most recent virtual post (i.e., the content item received from communications device 104B in step 312 above) is presented in user interface screen 400 of FIG. 4. The content item 402 reads "ZORBA—GREAT PIZZA!!" along with the timestamp 404 which informs the requesting user with current information concerning the nearby establishment. If there are additional content items in virtual post repository 110A at step 330, they may also be retrieved and transmitted whereby the process returns to step 322. Otherwise, the communications device 104A is notified of the last content item in the repository 110A.

As indicated above, there are two types of discover modes—active and passive. Turning back to step 316, if the communications device is in active discover mode, the process proceeds to FIG. 3B. Active discover mode enables a user of a communications device to proactively select from available content items stored in a virtual post repository without needing to sift through each and every content item. This may be performed by some type of search tool, e.g., index of content items, key word search engine, topical search tool, etc. In alternative exemplary embodiments, this may be performed by temporarily switching the communications device to broadcast mode and entering a query that is stored in a virtual post repository as a virtual post. A subsequent virtual poster may then read the post and send a reply via virtual post.

The virtual post application commands the WAN to transmit an acknowledgement message at step 334. The user then enters the search criteria (e.g., alphabetic character for searching entries with subjects beginning with the character entered, key word, selected topic or category from an index provided to the communications device, voice command, etc.). The virtual post application receives the inquiry at step 336 and, if applicable, parses the inquiry at step 338 and searches the virtual post repository for a match at step 340.

If a match is not found at step 342, an error message is transmitted to the communications device at step 344 and the process returns to step 304 of FIG. 3A whereby the WAN awaits the next signal. As indicated above, in alternative exemplary embodiments, a consortium of virtual post communities may be implemented as shown in the system of FIG. 1. For example, a user of communications device 104C has inquired about a subject as provided in steps 334-340. The virtual post application of WAN 102C has searched virtual post repository 110C and found no match for the requested item at step 342. In the alternative exemplary embodiments, the virtual post application of WAN 102C contacts WAN 102B at step 346 and sends the inquiry to WAN 102B at step 348. The virtual post application of WAN 102B searches virtual post repository for the content item and the process returns to step 342. This embodiment may be useful when an individual currently present in one virtual post community (e.g., within access of WAN 102C) is moving in the direction of another virtual post community (e.g., accessible to WAN 102B) and desires information specific to that other virtual post community. While located in the first virtual post community, the information available is significantly limited to topics relating to that first virtual post community.

Returning to step 342, if the WAN finds a match for the inquiry, it next determines whether the content item has timed out at step 350 via, e.g., the process described above with respect to FIG. 3A. If the content item has timed out at step 350, an error message is transmitted and the process returns to step 304 of FIG. 3A. In alternative exemplary embodiments, if the content item has timed out, an alternative WAN may be contacted at step 346 as described above. If the content item is current (i.e., has not timed out), the content item is transmitted to the device at step 352 and the process returns to step 304 of FIG. 3A whereby the WAN awaits the next signal.

Figure 5:
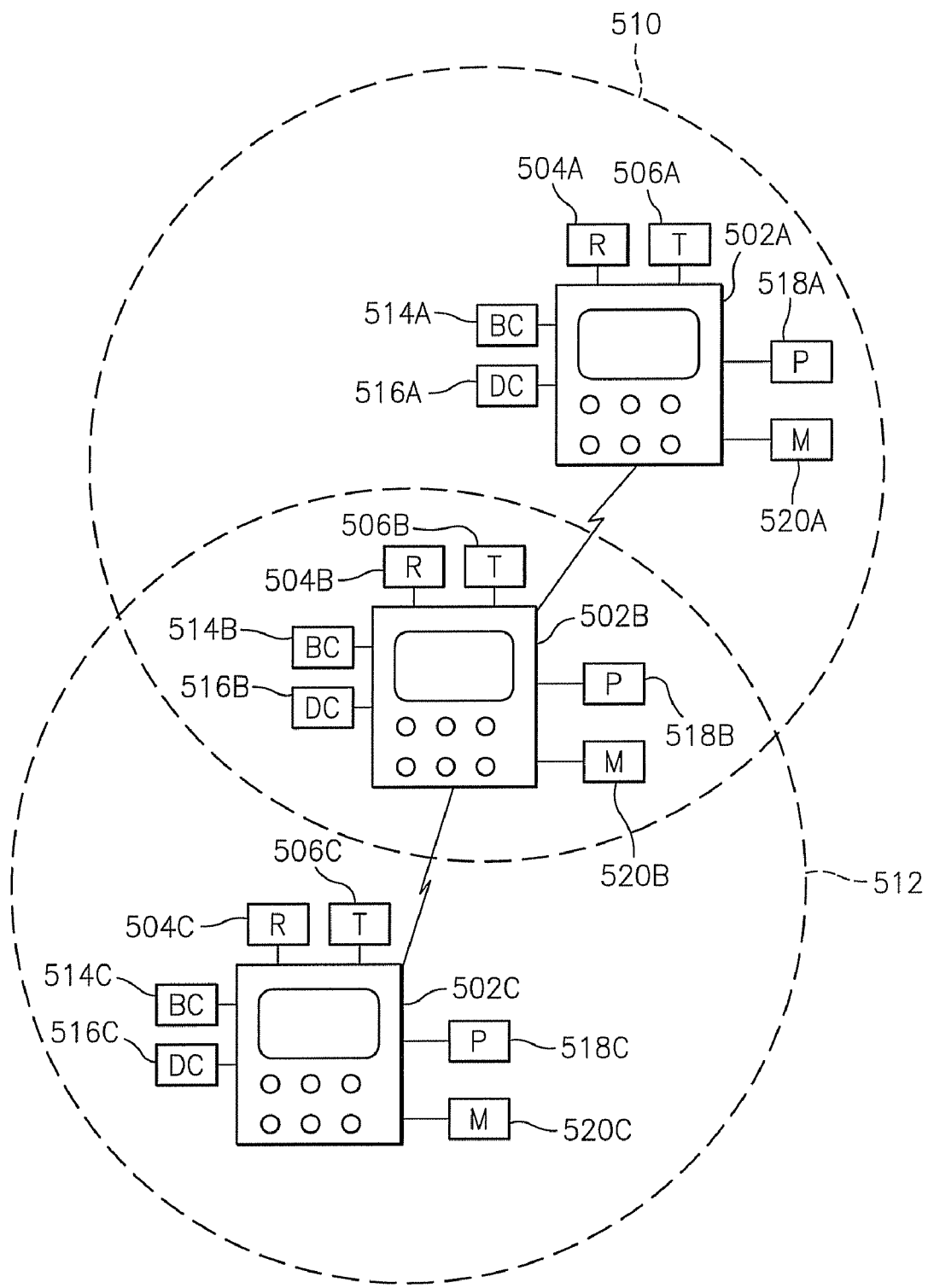
FIG. 5 is a block diagram of a system upon which the virtual posting services may be implemented in alternative exemplary embodiments.

As indicated above, the virtual posting services may be implemented directly between/among communications devices in a peer-to-peer fashion within a limited geographic proximity (e.g., a virtual post community) without the requirement of a fixed WAN. In this embodiment, the functionality of wireless access node 102A and virtual post repository 110A may be incorporated into communication devices 104A-104B without the requirement of a 'fixed' location WAN. Thus, participants (e.g., communications devices 104A-104B) may discover one another and relay information that is temporarily stored therein. Turning now to FIG. 5, a block diagram of a system upon which the virtual posting services may be implemented in a peer-to-peer network in alternative exemplary embodiments will now be described.

In the exemplary peer-to-peer embodiment of FIG. 5, three communications devices 502A-502C are shown. Communications devices 502A and 502B communicate with each other within virtual post community 510 and communications devices 502B and 502C communicate with one another within virtual post community 512, whereby the overlapping virtual post communities reflect that communications devices 502A and 502C are not able to communicate directly with one another. As shown in the system of FIG. 5, each of communications devices 502A-502C include receiver components 504A-504C, transmitter components 506A-506C, broadcast components 514A-514C, discover components 516A-516C, processors 518A-518C, and memory 520A-520C, respectively. The functionality of communications devices 502A-502C and their components are similar in nature to those described in FIGS. 1 and 2 with the exception that the access node capabilities are performed directly by the communications devices and the logic performed by the virtual post application are implemented by these communications devices 502A-502C via processors 518A-518C (e.g., a communications device uploads information received wirelessly within a limited geographic region from another communications device that is also located within that region) including the timer function as described above. In this sense, each communication device 502A-502C acts as an access node for other nearby communication devices. For example, an outdoor event occurs whereby users of portable communications devices discover and/or post information directly to one another within the event venue and which is available only to those devices within the venue. Optionally, that information may then be transmitted to a fixed access node for communicating information, e.g., to individuals on their way to the venue. This peer-to-peer embodiment may be particularly useful in remote or isolated areas lacking established communication capabilities.

In alternative embodiments, wireline communications device users may implement virtual posting services in a similar manner as that described above with respect to the wireless devices. Further, a combination of wireless/wireline communications devices and technologies may be utilized in implementing the virtual posting services.

As indicated above, the virtual posting system enables both broadcast and discovery of geographic proximity-specific content using multiple network protocols for asynchronously allowing information sharing between individuals within a limited proximity, and with a pre-determined timeout period for information prescience in order to ensure that the information base will always be current. The virtual posting system may accommodate multiple network protocols in order to facilitate hosting information from a maximum number of users. The virtual posting services may be implemented via a centrally-managed access node and storage facility, or sigmergically in a peer-to-peer network fashion.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing virtual post services, comprising:
   receiving, at a computer processor disposed at a fixed location that services a defined geographic community, content from a communications device located in the defined geographic community via an access node;

storing the content in a storage device that is in communication with the access node;

tracking an amount of time the content is stored;

detecting a presence of another communications device within the defined geographic community;

determining a mode status of the other communications device;

if the amount of time does not reach a pre-established threshold and the mode status of the other communications device is determined to be passive discover mode, automatically transmitting the content, by the computer processor, to the other communications device;

if the amount of time does not reach the pre-established threshold and the mode status of the other communications device is determined to be active discover mode, transmitting the content to the other communications device in response to an inquiry from the other communications device, the inquiry including a search criteria; and if the amount of time reaches the pre-established threshold, deleting the content from the storage device.

2. The method of claim 1, wherein the communications device is a wireless device.

3. The method of claim 1, wherein the content is relevant to events and entities within the defined geographic community.

4. The method of claim 1, wherein the content is time sensitive.

5. The method of claim 1, wherein the tracking the amount of time includes associating a timestamp with the content; and wherein further, the deleting the content if the amount of time reaches the pre-established threshold includes comparing the timestamp with a current time.

6. The method of claim 1, further comprising linking the access node to another access node, the method further comprising:

receiving the inquiry from the other communications device;

searching the storage device for content relating to the inquiry;

if the content relating to the inquiry is found, transmitting the content relating to the inquiry to the other communications device; and if the content relating to the inquiry is not found, relaying the inquiry to the other access node, the other access node searching another storage device for the content relating to the inquiry.

7. The method of claim 6, wherein the searching of the storage device for the content relating to the inquiry includes searching the storage device in response to a selection made via a searchable index of content.

8. The method of claim 1, further comprising linking the access node to another access node, the method further comprising:

receiving the inquiry from the other communications device;

searching the storage device for content relating to the inquiry;

if the content relating to the inquiry is found, transmitting the content relating to the inquiry to the other communications device; and if the content relating to the inquiry is not found, storing the inquiry in the storage device and transmitting the inquiry to communications devices detected in the defined geographic community.

9. A system for implementing virtual post services, comprising:

a virtual post application embedded in a computer readable medium and executing on a computer processor that is disposed at a fixed location and services a defined geographic community, the virtual post application performing:

receiving content from a communications device located in the defined geographic community via an access node;

storing the content in a storage device;

tracking an amount of time the content is stored; and detecting a presence of another communications device within the defined geographic community;

determining a mode status of the other communications device;

if the amount of time does not reach a pre-established threshold and the mode status of the other communications device is determined to be passive discover mode, automatically transmitting the content to the other communications device;

if the amount of time does not reach the pre-established threshold and the mode status of the other communications device is determined to be active discover mode, transmitting the content to the other communications device in response to an inquiry from the other communications device, the inquiry including a search criteria;

if the amount of time reaches the pre-established threshold, the virtual post application deletes the content from the storage device;

wherein the content is relevant to the defined geographic community.

10. The system of claim 9, wherein the communications device is a wireless device.

11. The system of claim 9, wherein the content is time sensitive.

12. The system of claim 9, further comprising another access node linked to the access node, the virtual post application further performing:

receiving the inquiry from the other communications device;

searching the storage device for content relating to the inquiry;

if the content relating to the inquiry is found, transmitting the content relating to the inquiry to the other communications device via the access node; and if the content relating to the inquiry is not found, relaying the inquiry to the other access node, the other access node searching another storage device for the content relating to the inquiry.

13. The system of claim 12, further comprising a searchable index of content, wherein the searching the storage device for the content relating to the inquiry includes searching the storage device in response to a selection made via the searchable index.

14. A computer program product for implementing virtual post services, the computer program product including instructions embedded in a non-transitory computer readable medium, which when executed by a computer processor cause the computer processor to perform a method, the method including:

receiving content from a communications device located in a defined geographic community via an access node, the computer processor disposed in a fixed location that services the defined geographic community;

storing the content in a storage device that is in communication with the access node;

tracking an amount of time the content is stored;

detecting a presence of another communications device within the defined geographic community;

determining a mode status of the other communications device;

if the amount of time does not reach a pre-established threshold and the mode status of the other communications device is determined to be passive discover mode, automatically transmitting the content to the other communications device;

if the amount of time does not reach the pre-established threshold and the mode status of the other communications device is determined to be active discover mode, transmitting the content to the other communications device in response to an inquiry from the other communications device, the inquiry including a search criteria; and if the amount of time reaches the pre-established threshold, deleting the content from the storage device.

15. The computer program product of claim 14, further comprising instructions for linking the access node to another access node, the method further comprising:

receiving the inquiry from the other communications device;

searching the storage device for content relating to the inquiry;

if the content relating to the inquiry is found, transmitting the content relating to the inquiry to the other communications device; and if the content relating to the inquiry is not found, relaying the inquiry to the other access node, the other access node searching another storage device for the content relating to the inquiry.

* * * * *